3,163,091
MEASURING APPARATUS
David G. Grier, Trevose, Pa., assignor to Honeywell Inc., a corporation of Delaware
Filed Sept. 18, 1962, Ser. No. 224,298
4 Claims. (Cl. 92—1)

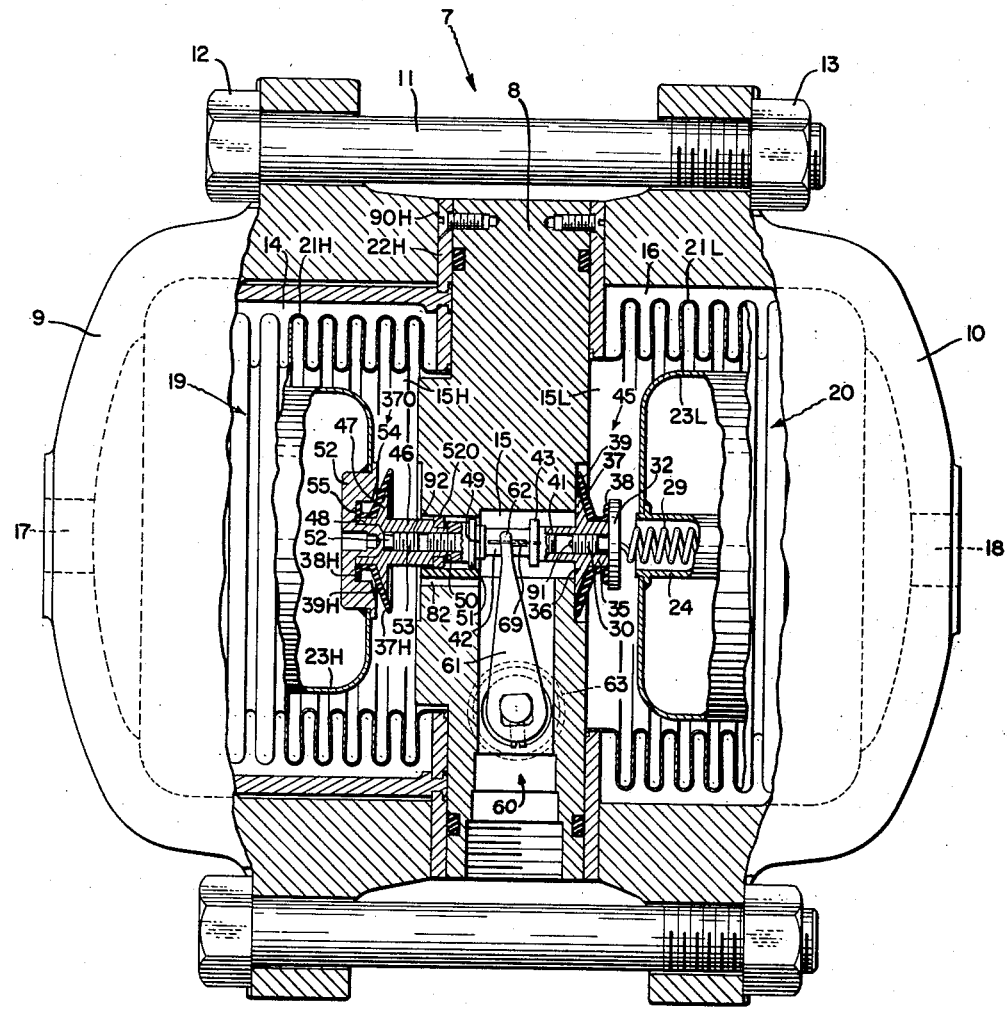

This invention relates to improvements in differential-pressure-operated meters of the type disclosed in United States Patent 2,985,194; patented on May 23, 1961 to George R. Brown, assignor to Minneapolis-Honeywell Regulator Company.

The device of this invention comprises a rigid case divided into a high pressure compartment, an intermediate pressure compartment and a low pressure compartment by two, pressure-responsive active elements, such as thin walled bellows. The intermediate compartment is adapted to be divided into three sub-compartments, each separated from the other by one of a pair of sealing valves connected to and actuated by one or both of the pressure-responsive elements. These sealing or overload valves are so arranged that, when excessive pressure is applied to either of the active elements, the sealing valve connected thereto closes. The closing of this sealing valve traps liquid behind the element and supports the active element by means of the liquid and the rigid walls of the case against excessive pressure applied thereto. Breaking of the active elements is thus prevented. It is an object of this invention to prevent locking of the device in the overload position, in which one of the valves is closed, as a result of temperature changes or small initial leakage while the sealing valve is closed.

If a temperature change in the meter occurs while in the overload position, it is possible to lock the meter in the overload position in which the sealing valve is closed. Assume that a differential pressure is applied sufficient to put the meter in overload. The high-pressure bellows closes one of the sealing valves, trapping a quantity of fill fluid in the high pressure compartment of the meter. If a drop in temperature occurs, the fluid trapped in the high pressure compartment of the meter will contract, reducing the pressure and creating additional locking force. Upon removal of the overload while at the reduced temperature, the meter will not return to normal. It is an object of this invention to provide a flexible sealing or overload valve which will release the differential across the valve and permit the meter to return to normal position. The sealing or overload valves of the prior art require actual movement of the active elements to open the valve.

An additional object of this invention is to provide a sealing or overload valve which provides more positive sealing at extremely low contact pressures, thus reducing the small leakage through the sealing valve. Small leakage through the sealing valve while in the closed position creates a differential pressure across the sealing valve that can lock the meter in the overload position. The small amount of leakage that does occur with this sealing valve during the initial contact, is released by the sealing valve upon removal of the overload.

A better understanding of the present invention may be had from the following detailed description when read in connection with the accompanying drawings, in which:

FIG. 1 is a substantially vertical, longitudinal, cross section.

This meter has a case 7 comprising an intermediate disc 8 to which are secured end discs 9 and 10 by means of a plurality of bolts 11, of which but two are shown in the drawings, having head 12 thereon and nut 13 secured thereto. The interior of case 7 is divided into high pressure chamber 14, intermediate pressure chamber, and a low pressure chamber 16 by active elements 19 and 20. This intermediate chamber is sub-divided into chambers 15, 15H, and 15L, which are adapted to be filled with a substantially incompressible liquid. Connection 17 conducts high pressure to chamber 14 while connection 18 conducts low pressure to chamber 16. The active elements 19 and 20 might be pistons cooperating with the walls of the case or might be cylinders or single diaphragms but are shown as thin-walled, metallic bellows. These bellows are substantially duplicates so that a description of one of them will suffice. The same reference characters are applied to the same parts of the active elements distinguished by an H for the high pressure active element 19 and an L for the low pressure element 20.

Active element 19 comprises a thin-walled, metallic bellows 21H secured at one end to case 7 by a bellows ring 22H which is connected to intermediate disc 8 by a plurality of screws 90H, of which but one is shown in the drawing. At the free or movable end of bellows 21H is secured a cup 23H.

Between chamber 15H and 15 is located a first sealing or overload valve 370. Between chamber 15L and chamber 15 is located a second sealing or overload valve 45. Sealing or overload valves 370 and 45 are actuated from the free or movable end of active element 20 by the following mechanism.

Cup 23L has secured to it a tube 24 which has screw threads in engagement with a cap (not shown in the drawings). The right hand end of stabilizing spring 29 is secured to cap. The left hand end of spring 29 is secured by silver solder 91 or the like to screw 30. Screw 30 has on an outer surface screw threads which mate with screws on an inner surface of valve plug 35. Valve plug 35 has a frusto-conical flange 36 on it. Screw threads on valve plug 35 also mate with screw threads on a bolt 41. Valve 37 is mounted on valve plug 35 so that flange 38 engages with flange 32 on plug 35 and flange 39 engages with but extends beyond the rim of flange 36 on valve plug 35. The rim of flange 39 is therefore free to engage with and to flex relative to the vertical wall of intermediate ring 8 and to form a sealing or overload valve therewith. Mounted on bolt 41 is a thimble 42 having a flange 43 on one end thereof. Flange 43 butts against the left end of valve plug 35. The left end of thimble 42 butts against a washer 49 which surrounds rod 41 and butts against the right end of a spacer ring 50 having a flange 51 on it. The left face of spacer ring 50 butts against the right face of rod sealing ring 520. Rod sealing ring 520 seals chamber 15H from chamber 15 so that the communication between 15H and 15 must take place through a by-pass passage 82.

High pressure sealing valve 370 comprises a valve plug 46 having screw threads 92 on the internal surface thereof which mate with screw threads on rod 41. Valve plug 46 has a frusto-conical flange 47 on the outer surface thereof and a cavity 48 in the left hand inner end thereof. Valve plug 52 has screw threads 53 on an outer, right hand surface thereof which mate with screws 92 on the inner surface of valve plug 46. Valve plug 52 has a flange 54 at the rim thereof which is connected to cup 23H by welding or the like. A valve 37H is mounted on valve plugs 46 and 52 in such a way that flange 38H engages vertical wall 55 of valve plug 52 while flange 39H engages with frusto-conical flange 47 on valve plug 46. The free rim of flange 39H is beyond the rim of flange 47 and engages with and flexes relative to the vertical wall of intermediate ring 8 so as to form the high-pressure sealing or overload valve 370.

The output element of the meter is generally indicated 60 and comprises a lever 61 having a rounded face 62 which is connected to flange 43 by a cable 69. Lever 61 is connected at its inner end to a torque tube, generally indicated 63. One end of torque tube 63 extends out of case 7 and is adapted to have an indicating pointer, a recording pen, or the actuating element of a controller mounted thereon so that the pointer, pen, or controller is actuated by the torque tube in response to the difference between the pressures applied to the active elements 19 and 20.

The operation of the pressure-responsive device of this invention is as follows. Assume that the pressure in the high-pressure chamber 14 is balanced by the pressure in low-pressure chamber 16 and that the device is therefore at rest. Now assume an increase in the pressure in chamber 14. This causes cup 23H to actuate the motion-transmitting linkage so as to rotate lever 61 about its axis and thereby actuate the output element 60 so as to cause the pointer, pen, or actuating element on the end of torque tube 63 outside of case 7 to be moved. This movement of output element 60 will continue until the pressure in chamber 14 plus the force due to the extension of any range springs attached to rod 41 and the force due to the compression of bellows 21H is balanced by the pressure in chamber 16 plus the force due to the extension of bellows 21L.

If the cup 23L is not connected to the motion-transmitting linkage, the movement of active element 19 is transmitted to the output element 60 by means of the liquid in chambers 15H, 15, and 15L so as to cause cup 23L to move and thereby actuate the output element 60 through the stabilizing spring 29 and the remaining portion of the motion-transmitting linkage already described. If the pressure in chamber 14 becomes excessive, the first sealing valve 370 closes by engagement of the flexible flange 39H of flexible valve 370 with the left hand, vertical wall of intermediate ring 8. The closing of first sealing valve 370 shuts off communication between chambers 15H and 15. Closing of first sealing valve 370 traps liquid in chamber 15H. Since this liquid is substantially incompressible, the active element 19 cannot be further compressed and is thereby prevented from being ruptured from the excessive pressure applied to it.

Starting from normal, balanced condition wherein the parts are at rest, if the pressure in chamber 16 were to increase with respect to the pressure in chamber 14, the motion-transmitting linkage would move in the opposite direction. If the pressure in chamber 16 were to become excessive, the second sealing valve would close by engagement with the rim of flange 39L with the right hand, vertical face of intermediate ring 8.

First sealing valve 370 being closed, if a drop in temperature occurs, the fluid in chamber 15H will contract, reducing the pressure and creating additional locking force. Upon a reduction of the pressure in chamber 14, while the temperature remains reduced, the meter will not return to normal balanced condition. However, the flexible rim 39H of the first sealing or overload valve 370 will flex and will relieve differential pressure across the first sealing valve 370 and thereby permit the meter to return to normal, balanced position.

In addition, the flexible rim 39H of the first sealing or overload valve 370 provides more positive sealing at extremely low contact pressure thus reducing the small leakage through the first sealing valve 370. Small leakage through the sealing valve 370, while closed, creates a differential pressure across the valve 370 that can lock the meter in the overload position. A small amount of leakage, that does occur through valve 370, including the initial contact, is released by the flexible rim 39H upon removal of the overload.

In summary, the differential-pressure-responsive device in this invention is compensated against changes in ambient temperature and against small leakages through the sealing or overload valves by provision of the flexible rims of these sealing or overload valves. This improvement in operating characteristics between the active elements and the output element of the device prevents erroneous indications from the device upon removal of excessive pressures.

What is claimed is:

1. In a device responsive to the difference between two pressures, a rigid case having a hollow interior, a first thin-walled metallic bellows having a movable portion dividing the interior of said case into a chamber connected to one of said pressures and an intermediate chamber, a second thin-walled metallic bellows having a movable portion dividing said intermediate chamber from a chamber connected to the other of said pressures, said intermediate chamber being adapted to contain a substantially incompressible fill liquid in it, a rod connected to at least one of said bellows and movable in response to said bellows, and a pair of sealing valves mounted on said rod and each having a flexible disc-shaped portion extending from said rod at an angle to a wall of said case and adapted to yieldingly engage the wall of said case so as to prevent passage of said fluid between portions of said intermediate chamber in one direction but to allow passage of fluid between said portions of said intermediate chamber in the other direction.

2. Means for stabilizing a device responsive to the difference between two pressures against errors caused by changes in volume of a fill liquid in the device due to changes in the ambient temperature surrounding said device or changes in the differential pressure between portions of said fill liquid, which means include, a rigid case having a hollow interior, a first movable active element in the interior of said case and separating a chamber connected to one of said pressures from an intermediate chamber, a second movable active element in the interior of said case and separating said intermediate chamber from a chamber connected to the other of said pressures, said intermediate chamber being adapted to be filled with a substantially incompressible fill liquid, a rod connected to at least one of said active elements and movable therewith, and a pair of sealing valves mounted on said rod and each comprising, a valve plug having a frusto-conical flange on an outer surface thereof which engages with a wall of said rigid case so as to form a seal against the flow of the liquid, and a flexible valve having a disc whose rim projects beyond the rim of said flange and engages with and flexes relative to a wall of said rigid case so as to form a seal against the flow of the liquid in one direction and to permit flow of said fill liquid in the opposite direction.

3. Means for stabilizing a device responsive to the difference between two pressures against changes in surrounding temperatures, said device including, a rigid case having a hollow interior, a first thin-walled metallic bellows having a movable proportion dividing the interior of said case into a chamber connected to one of said pressures and an intermediate chamber, a second thin-walled metallic bellows having a movable portion dividing said intermediate chamber from a chamber in the interior of said case and connected to the other of said pressures, said intermediate chamber being adapted to contain a fill fluid in it, an output element passing through a wall of said case and movably mounted and sealed pressure tight therein and connected to said case through first bellows, a rod mounted in said case and forming a connection between said output element and said first bellows, a first valve connected between the interior of said first bellows and said intermediate chamber, a second valve located between the interior of said second bellows and said intermediate chamber, said valves having flexible frusto-conical faces mounted on and movable with said rod and each adapted to close one of said valves upon movement of said rod in one direction and to close the other of said valves upon movement of said rod in the opposite direction.

4. Means for stabilizing a device responsive to the difference between two pressures against errors caused by changes in volume of a fill liquid in the device due to changes in the ambient temperature surrounding said device or changes in the differential pressure between portions of said liquid, which means including, a rigid case having a hollow interior, a first movable active element in the interior of said case and separating a chamber connected to one of said pressures from an intermediate chamber, a second movable active element in the interior of said case and separating the intermediate chamber from a chamber connected to the other of said pressures, said intermediate chamber being adapted to be filled with a substantially incompressible liquid, a rod connected to at least one of said active elements and movable therewith, and a pair of sealing valves mounted on said rod, at least one of said sealing valves comprising, a valve plug having a frusto-conical flange on an outer surface thereof which engages with the wall of said rigid case so as to form a seal against the flow of the liquid, and a flexible valve having a disc whose rim projects beyond the rim of said flange and engages and flexes relative to a wall of said rigid case so as to form a seal against the flow of liquid in one direction and to permit flow of said liquid in the opposite direction.

References Cited in the file of this patent

UNITED STATES PATENTS

| | | |
|---|---|---|
| 1,575,771 | King | Mar. 9, 1926 |
| 2,093,662 | Steirly | Sept. 21, 1937 |
| 2,664,749 | Jones | Jan. 5, 1954 |
| 2,875,784 | Cole | Mar. 3, 1959 |
| 2,977,990 | Bauer | Apr. 4, 1961 |
| 2,985,194 | Brown | May 23, 1962 |
| 3,029,835 | Biello et al. | Apr. 17, 1962 |
| 3,050,085 | Reese | Aug. 21, 1962 |
| 3,058,487 | Helling | Oct. 16, 1962 |